(12) United States Patent
Rule et al.

(10) Patent No.: US 9,422,964 B2
(45) Date of Patent: Aug. 23, 2016

(54) BLIND FASTENERS

(71) Applicant: 3M INNOVATIVE PROPERTIES COMPANY, St. Paul, MN (US)

(72) Inventors: Joseph D. Rule, Cottage Grove, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 6 days.

(21) Appl. No.: 14/276,070

(22) Filed: May 13, 2014

(65) Prior Publication Data

US 2014/0248106 A1 Sep. 4, 2014

Related U.S. Application Data

(63) Continuation-in-part of application No. 13/260,581, filed as application No. PCT/US2010/030160 on Apr. 7, 2010, now Pat. No. 8,763,231.

(60) Provisional application No. 61/175,485, filed on May 5, 2009, provisional application No. 61/168,342, filed on Apr. 10, 2009.

(51) Int. Cl.
| | |
|---|---|
| *F16B 19/06* | (2006.01) |
| *F16B 1/00* | (2006.01) |
| *B29C 61/02* | (2006.01) |
| *B29C 65/68* | (2006.01) |

(Continued)

(52) U.S. Cl.
CPC ............... *F16B 19/06* (2013.01); *B29C 61/02* (2013.01); *F16B 1/0014* (2013.01); *B29C 65/604* (2013.01); *B29C 65/68* (2013.01); *B29C 66/21* (2013.01); *B29C 66/304* (2013.01); *B29C 66/8322* (2013.01); *B29C 66/91411* (2013.01); *B29C 66/91943* (2013.01); *Y10T 29/49865* (2015.01)

(58) Field of Classification Search
CPC .......... F16B 19/06; F16B 1/0014; B21J 5/00; B29C 61/02; B29C 66/91943; B29C 66/21; B29C 66/8322; B29C 65/604; B29C 66/304; B29C 66/91411; B29C 65/68; Y10T 29/49865
See application file for complete search history.

(56) References Cited

U.S. PATENT DOCUMENTS

| | | |
|---|---|---|
| 2,458,152 A | 1/1949 | Eakins |
| 4,436,858 A | 3/1984 | Klosiewicz |

(Continued)

FOREIGN PATENT DOCUMENTS

| | | |
|---|---|---|
| CN | 101126473 | 2/2008 |
| EP | 0 296 003 | 12/1988 |

(Continued)

OTHER PUBLICATIONS

Irie, "Shape Memory Polymers," Shape Memory Materials, Chapter 9, pp. 203-219, Cambridge University Press 1998.

(Continued)

*Primary Examiner* — John C Hong
(74) *Attorney, Agent, or Firm* — Adrian L. Pishko; Kent S. Kokko

(57) ABSTRACT

Fasteners for producing double blind joints where the fastener is not visible or accessible are provided. The fasteners comprise a shape memory polymer that may be used to fasten workpieces by heating the fasteners, inducing recovery of the original, permanent shape of the fasteners.

17 Claims, 2 Drawing Sheets

(51) Int. Cl.
*B29C 65/60* (2006.01)
*B29C 65/00* (2006.01)

(56) References Cited

U.S. PATENT DOCUMENTS

| | | | |
|---|---|---|---|
| 4,469,357 | A | 9/1984 | Martin |
| 4,832,382 | A | 5/1989 | Kapgan |
| 4,872,713 | A | 10/1989 | Kapgan |
| 5,145,935 | A | 9/1992 | Hayashi |
| 5,155,199 | A | 10/1992 | Hayashi |
| 5,506,300 | A | 4/1996 | Ward et al. |
| 5,665,822 | A | 9/1997 | Bitler et al. |
| 6,160,084 | A | 12/2000 | Langer et al. |
| 6,388,043 | B1 | 5/2002 | Langer et al. |
| 7,173,096 | B2 | 2/2007 | Mather et al. |
| 7,308,738 | B2 * | 12/2007 | Barvosa-Carter et al. ...... 24/442 |
| 7,410,700 | B2 * | 8/2008 | Wang ............................ 428/412 |
| 7,516,990 | B2 | 4/2009 | Jamison et al. |
| 2001/0015462 | A1 | 8/2001 | Powell |
| 2003/0170092 | A1 | 9/2003 | Chiodo et al. |
| 2005/0244353 | A1 | 11/2005 | Lendlein et al. |
| 2006/0041089 | A1 | 2/2006 | Mather et al. |
| 2007/0009465 | A1 | 1/2007 | Lendlein et al. |
| 2008/0201914 | A1 | 8/2008 | Turner et al. |
| 2013/0201441 | A1 | 8/2013 | Chiu et al. |

FOREIGN PATENT DOCUMENTS

| | | |
|---|---|---|
| JP | 59-231208 | 12/1984 |
| JP | 60081572 | 5/1985 |
| JP | 2163594 | 6/1990 |
| JP | 3265784 | 11/1991 |
| JP | 4282093 | 10/1992 |
| JP | 0663907 | 9/1994 |
| JP | 07126125 | 5/1995 |
| JP | 2505568 | 6/1996 |
| JP | 2959775 | 7/1999 |
| JP | 2003-517230 | 5/2003 |
| JP | 2006242285 | 9/2006 |
| JP | 51-89061 | 4/2013 |
| WO | 03/084489 | 10/2003 |
| WO | 03/093341 | 11/2003 |
| WO | 2008/129245 | 10/2008 |

OTHER PUBLICATIONS

Gorden, "Applications of Shape Memory Polyurethanes," Proceedings of the First International Conference on Shape Memory and Superelastic Technologies, SMST International Committee, pp. 115-120, (1994).

Kim et al., "Polyurethanes having shape memory effect," Polymer, vol. 37, Issue 26, pp. 5781-5793, (1996).

Li et al., "Crystallinity and Morphology of Segmented Polyurethanes with Different Soft-Segment Length," Journal of Applied Polymer Science, vol. 62, Issue 4, pp. 631-638, (1996).

Takahashi et al., "Structure and Properties of Shape-Memory Polyurethane Block Copolymers," Journal of Applied Polymer Science, vol. 60, Issue 7, pp. 1061-1069, (1996).

Tobushi, et al., "Thermomechanical Properties of Shape Memory Polymers of Polyurethane Series and their Applications," Journal de Physique IV, Colloque C1, supplement au Journal de Physique III., vol. 6, pp. 377-384, (1996).

Yakacki et al., "Strong, Tailored, Biocompatible Shape-Memory Polymer Networks," Advanced Functional Materials, vol. 18, pp. 2428-2435, (2008).

Safranski et al., "Effect of chemical structure and crosslinking density on the thermo-mechanical properties and toughness of (meth) acrylate shape memory polymer networks," Polymer, vol. 49, pp. 4446-4455, (2008).

Material Safety Data Sheet, MM-9020, Polyurethane Compound, Issue Date: Jan. 15, 2011, 4 pages.

* cited by examiner

BLIND FASTENERS

CROSS REFERENCE TO RELATED APPLICATIONS

This application is a continuation-in-part of U.S. application Ser. No. 13/260,581, filed Sep. 27, 2011, which is a national stage filing under 35 U.S.C. 371 of PCT/US2010/030160, filed Apr. 7, 2010, which claims priority to U.S. Provisional Application No. 61/175,485, filed May 5, 2009 and U.S. Provisional Application No. 61/168,342, filed Apr. 10, 2009; the disclosures of which are incorporated by reference in their entireties herein.

FIELD OF THE INVENTION

The present invention is directed to fasteners for producing blind joints where the fastener is not visible or accessible. The fasteners comprise a shape memory polymer that may be used to fasten two workpieces by heating the fasteners.

BACKGROUND

There are many situations where it is required to permanently or semi-permanently connect two workpieces where there is access to only one side of the assembly. Examples include the attachment of panels or plates to underlying frames or supports in structures such as aircraft, ships, cars, etc. Arrangements such as captive bolts, blind rivets, rivet nuts etc., may be used in such applications. There are however disadvantages with such arrangements. For example, with rivets and captive nuts, the surface of the panel is interrupted by the head of the rivet or bolt.

Sometimes it is necessary to produce blind joints. A blind joint is a joint where, after the joint has been assembled, the fastener is not visible and/or accessible to observers without damage to the fastener and/or the workpiece, although the fastener may be visible if the workpiece is transparent. These joints are preferred over other types of joints because they hide the appearance of the actual joint itself. Mechanical fasteners, such as nails and screws, can also be used to create joints. Mechanical fasteners are generally easy to use (they require little or no skill), and can be used to produce joints quickly. However, mechanical fasteners by themselves cannot be used to create blind joints. In other words, after a joint has been assembled using mechanical fasteners, those mechanical fasteners are generally exposed and visible. On some pieces, for example, high-quality furniture and trimwork, the appearance of exposed mechanical fasteners such as nails and screws is inappropriate. In other applications, such as electronic circuitry and computer components, the small size and complexity often requires the use of blind joints to fasten the component parts.

Blind joints currently exist, but prior art blind joints require expensive tools, jigs, or fixtures, and are usually difficult to make. Some examples of existing blind joints in furniture and other industries include the mortise-and-tenon joint, half-blind dovetail joint, double-blind dovetail, a dowel joint and a biscuit joint. Another blind joint includes a dowel fastener used in furniture manufacture in which a dowel is inserted into adjoining parts and secured by compression and/or adhesives.

As well known in the prior art, these joints require either considerable machining and skill, in the case of the mortise-and-tenon joint, half-blind dovetail joint, and the double-blind dovetail, or expensive jigs and fixtures, specialized tools and adhesives, in the case of the dowel joint and the biscuit joint.

In addition to the specialized tools, considerable skill is also required to properly make the joints. They also require a considerable amount of time to lay out and prepare the various tools to make the appropriate cuts for these joints. So these prior art joints are time-consuming in two ways: an artisan would require time to practice and develop the necessary skills to produce the joints, and once the artisan has learned the craft of making the joint, actually making the joint itself and, often, allowing the adhesive to cure is time-consuming.

SUMMARY

Accordingly, the present invention is directed to a fastener for producing a blind joint that substantially obviates one or more of the limitations and disadvantages of the related art. The present disclosure provides a fastener that can join two opposed items to provide a blind joint, meaning that the fastener itself is not accessible without damaging the workpiece(s) or fastener after the joint has been formed. Further, the fastener is generally not visible along the longitudinal axis of the fastener, unless the workpieces are transparent. The present disclosure further provides a fastener that is easy to install, requires little skill, and allows two opposed items to be joined quickly.

The present disclosure provides a method of making blind joints comprising providing two workpieces each having a cavity with an opening on the surface thereof; inserting a fastener into the respective cavities, wherein the fastener comprises a shape memory polymer; and heating the blind fastener so that the fastener expands laterally and shrinks axially to engage the surfaces of the cavities and hold the two workpieces together. The fastener also contracts or shrinks axially, along the longitudinal axis of the fastener so that the two workpieces are drawn together.

Briefly, the present disclosure provides an assembly comprising first and second workpieces fastened in a blind joint by an inaccessible shape memory polymer fastener. More particularly, the present disclosure further provides an assembly comprising first and second workpieces fastened in a blind joint by an inaccessible shape memory polymer fastener. The workpieces are securably fastened by means of the recovery of the shape memory polymer in response to heat, in which the fastener expands laterally to engage the cavities of the workpieces, and contracts or shrinks along the longitudinal axis so that the respective faces are drawn together in a blind joint. Additional workpieces may also be inserted between the first and second workpieces, the additional workpieces having through-holes.

The present disclosure further provides an assembly comprising first and second workpieces fastened in a blind joint, each workpiece having a cavity defining an opening in a surface of each workpiece, and further wherein each cavity includes cavity surfaces; and a shape memory polymer fastener securably affixed to at least a portion of each of the cavities.

The present disclosure further a method of forming an attachment between at least two workpieces, wherein each of the two workpieces contains a cavity having interior surfaces and an opening in a surface of each workpiece, the method comprising the steps of placing an oriented shape memory polymer fastener having a first deformed shape into at least a portion of each of the cavities, and heating at least a portion of the shape memory polymer fastener thereby to recover the shape memory polymer fastener to an original, permanent shape, whereby the shape memory polymer expands laterally into mating engagement with the surfaces of the cavities, thereby securably affixing the workpieces to each other. The method results in a blind joint between the surfaces of the workpieces.

Shape memory polymers (SMPs) have the unique ability to "remember" an original, permanent shape and, upon exposure to the appropriate stimuli, shift from a deformed or altered shape back to the permanent shape. Several commercially important uses have been developed for shape memory polymers. For example, shape memory polymers are commonly used in various medical, dental, mechanical, and other technology areas for a wide variety of products.

DETAILED DESCRIPTION

Figure 1:
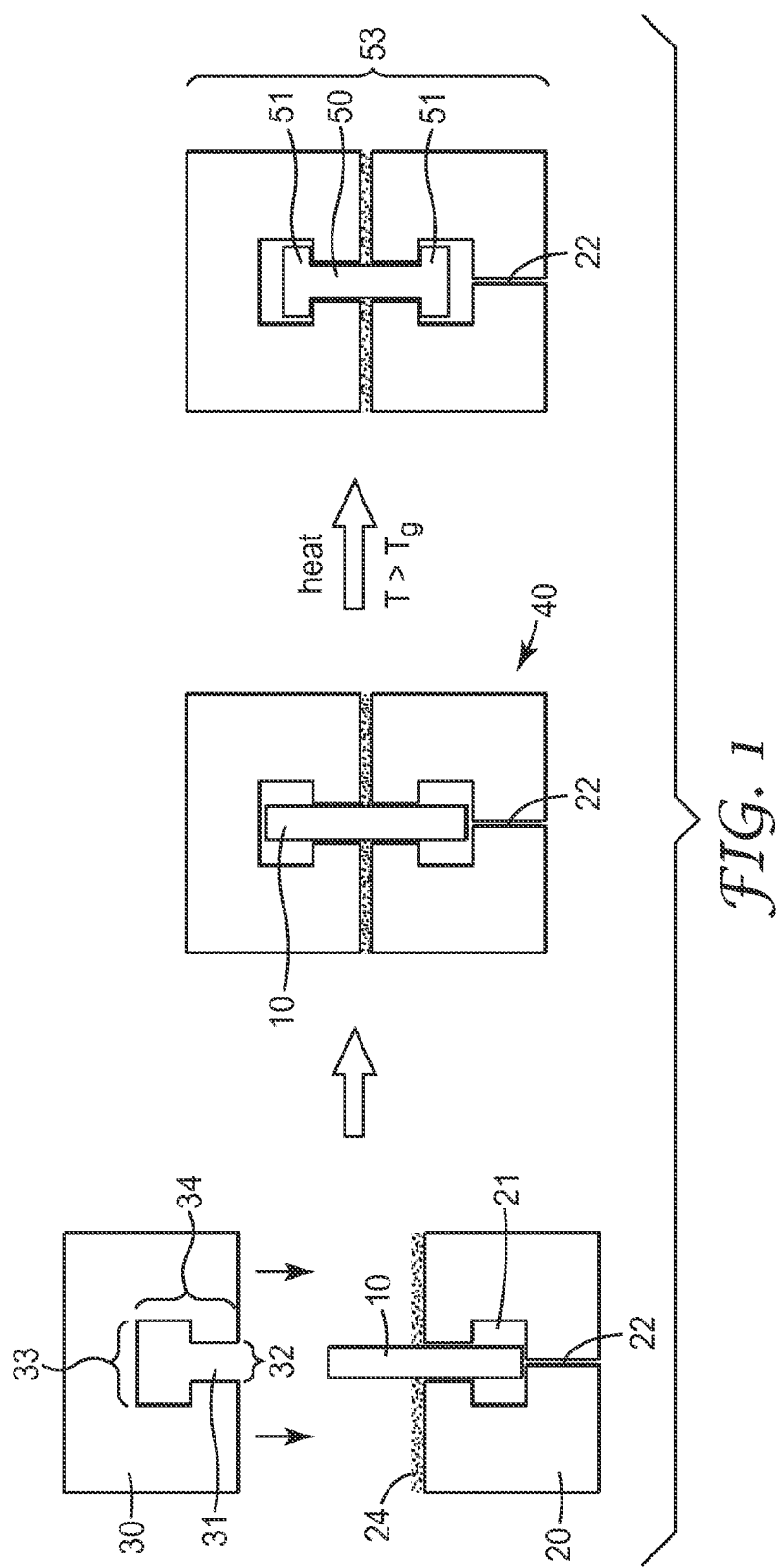
FIGS. 1 and 2 illustrate embodiments of the disclosed method.

The present disclosure provides a fastening system and a method of fastening for blind joints.

Shape memory polymers are known to have the unique ability to be set in a pre-set shape, deformed to an altered shape, and then revert back to the pre-set shape when exposed to the appropriate stimuli (e.g., changes in temperature, application of solvent, etc.). Because the fasteners disclosed herein comprise a shape memory polymer, the portion of the article (or the entire article if made completely from a shape memory polymer) having the shape memory polymer can be configured to utilize this property. For example, the fastener article may include a shape memory polymer surface that has been cast or otherwise shaped to have a permanent shape or configuration. This surface can be deformed to an altered or deformed shape and then be shifted back or recovered to the permanent shape when appropriately triggered. Triggering the shift from the deformed shape to the permanent shape can vary depending on the particular polymer used or other parameters. However, at least some of the shape memory polymers disclosed herein can be shifted by exposure to elevated temperatures and/or to an appropriate solvent.

Shape memory polymers can be classified as elastomers. On the molecular level they represent polymer networks that include segment chains that are connected by netpoints. The netpoints can be formed by entanglements of the polymer chains or intermolecular interaction of certain polymer blocks. These cross-links are called physical netpoints. Crosslinks in the form of covalent bonds form chemical netpoints. An elastomer exhibits a shape-memory functionality if the material can be stabilized in the deformed state in a temperature range that is relevant for the particular application. This can be achieved by using the network chains as a kind of molecular switch. For this purpose, it should be possible to limit the flexibility of the segments as a function of temperature. This process is supposed to be reversible. The ability to incorporate a control function into the material provides a thermal transition $T_{trans}$ of the network chains in the temperature range of interest for the particular application. At temperatures above $T_{trans}$ the chain segments are flexible, whereas the flexibility of the chains below this thermal transition is at least partially limited. In the case of a transition from the rubber-elastic, i.e., viscous, to the glassy state the flexibility of the entire segment is limited.

Without being bound to theory, it is believed that the copolymer network includes an elastomeric phase or component and a "glassy" or high glass transition temperature phase or component. The glassy phase holds or constrains the elastomeric component so that the substrate can be deformed into and stays in the deformed shape. Shifting from a deformed shape to the original or permanent shape generally includes mobilizing the glassy phase of the shape memory polymer in order to allow the elastomeric component to "spring back" or otherwise shift to the original permanent shape. According to this theory, mobilizing is understood to be the mobilization of the glassy phase through the application of the appropriate external stimuli.

SMPs have a defined melting point ($T_m$) or glass transition temperature ($T_g$). Collectively, the melting point ($T_m$) or glass transition temperature ($T_g$) will be referred to as the transition temperature or $T_{trans}$. Above the $T_{trans}$ the polymers are elastomeric in nature, and are capable of being deformed with high strain. The elastomeric behavior of the polymers results from either chemical crosslinks or physical crosslinks (often resulting from microphase separation). Therefore, SMPs can be glassy or crystalline and can be either thermosets or thermoplastics.

The permanent shape of the SMP is established when the crosslinks are formed in an initial casting or molding process. The SMP can be deformed from the original shape to a temporary shape. This step is often done by heating the polymer above its $T_{trans}$ and deforming the sample, and then holding the deformation in place while the SMP cools. Alternatively, in some instances the polymer can be deformed at a temperature below its $T_{trans}$ and maintain that temporary shape. Subsequently, the original shape is recovered by heating the material above the melting point or glass transition temperature.

The recovery of the original shape, which may be induced by an increase in temperature, is called the thermal shape memory effect. Properties that describe the shape memory capabilities of a material are the shape recovery of the original shape and the shape fixity of the temporary shape. The advantages of the SMPs will be closely linked to their network architecture and to the sharpness of the transition separating the rigid and rubber states. SMPs have an advantage of capacity for high strain: to several hundred percent.

Any shape memory polymer may be used in the preparation of the fastener. In some embodiments the shape memory polymer composition may be cast into a permanent shape and deformed to a temporary shape at a temperature below the $T_{trans}$ so the deformed temporary shape is retained. Alternatively, the shape memory polymer composition may be cast into a permanent shape, deformed at a temperature above the $T_{trans}$, and then cooled to a temperature below the $T_{trans}$ so the deformed temporary shape is retained. With either deformation method, when the deformed article is heated above the $T_{trans}$ the deformed article will elastically recover the permanent shape.

Useful SMPs may be physically or chemically crosslinked. Chemically crosslinked, thermoset shape memory polymers are preferred. Examples of suitable physically crosslinked SMP include, but are not limited to, linear block copolymers, such as thermoplastic polyurethane elastomers with hard segment as permanent shape and soft segment as switching temporary shape. Multiblock copolymers can also serve as SMP, such as polyurethanes with a polystyrene and poly(1,4-butadiene), ABA triblock copolymers of poly(tetrahydrofuran) and poly(2-methyl-2-oxazoline), polynorbornene, polyhedral oligomeric silsesquioxane (POSS)-modified polynorbornene, and PE/Nylon-6 grafted copolymer.

Examples of polymers that have been utilized in hard and soft phases of shape memory polymers include polyurethanes, polynorbornenes, polyethers, polyacrylates, polyamides, polysiloxanes, polyether amides, polyether esters, trans-polyisoprenes, polymethylmethacylates, cross-linked trans-polyoctylenes, cross-linked polyethylenes, cross-linked polyisoprenes, cross-linked polycyclooctenes, inorganic-organic hybrid polymers, copolymer blends with polyethylene and styrene-butadiene co-polymers, urethane-butadiene co-polymers, PMMA, polycaprolactone or oligo caprolactone copolymers, PLLA or PL/D LA co-polymers, PLLA PGA co-polymers, and photocrosslinkable polymers including azo-dyes, zwitterionic, and other photochromatic materials such as those described in "Shape Memory Materials" by Otsuka and Wayman, Cambridge University Press 1998, the entire contents of which are incorporated herein by reference. Examples of suitable chemical crosslinked shape-memory polymers include, but are not limited to, HDPE, LDPE, copolymer of PE and polyvinyl acetate.

Suitable shape memory polymers include but are not limited to those described in WO 03/084489; U.S. Pat. No. 5,506, 300 (Ward et al.), U.S. Pat. No. 5,145,935 (Hayashi), U.S. Pat. No. 5,665,822 (Bitler et al.), and Gorden, "Applications of Shape Memory Polyurethanes," *Proceedings of the First International Conference on Shape Memory and Superelastic Technologies*, SMST International Committee, pp. 115-19 (1994); U.S. Pat. No. 6,160,084 (Langer), U.S. Pat. No. 6,388,043 (Langer), Kim, et al., "Polyurethanes having shape memory effect," *Polymer* 37(26):578I-93 (1996); Li et al., "Crystallinity and morphology of segmented polyurethanes with different soft-segment length," *J Applied Polymer* 62:631-38 (1996); Takahashi et al., "Structure and properties of shape-memory polyurethane block polymers," *J. Applied Polymer Science* 60:1061-69 (1996); Tobushi H., et al., "Thermomechanical properties of shape memory polymers of polyurethane series and their applications," *J Physique IV* (Colloque C1) 6:377-84 (1996)), the contents of which are incorporated by reference herein in their entirety. Other SMPs are described in U.S. Pat. No. 5,155,199 (Hayashi), U.S. Pat. No. 7,173,096 (Mather et al.), U.S. Pat. No. 4,436,858 (Klosiewicz), JP 07126125, JP 2959775, U.S. 2005/244353 (Lendlein et al.), and U.S. 2007/009465 (Lendlein et al.), the disclosure of which are hereby incorporated by reference herein. Acrylic SMP are disclosed in U.S. 2006/041089 (Mather et al.), C. M. Yakachi et al., in *Advanced Functional Materials*, 18 (2008), 2428-2435, and D. L. Safranski et al., in *Polymer* 49 (2008)4446-4455.

Commercially available thermoplastic SMPs include, but are not limited to, polyacrylates such as the PMMA and JTbu series (PolymerExpert), cycloaliphatic polyutherurethane Tecoflex (TFX) (Noveon), polyurethane foam of polyether polyol series—Diary, including the MM type, MP type, MS type and MB (microbead powder) type series (Diaplex Co. Ltd.)., "Calo-MER" from the Polymer Technical Group, elastic memory composite ("EMC") from Composite Technology Development, Inc. or "Veriflex" from Cornerstone Research Group ("CRG").

Generally, the SMP is chosen such that the $T_{trans}$ is at a temperature suitable for fastening workpieces, and above any temperatures to which the fastened workpieces might be expected to be exposed. In some embodiments the $T_{trans}$ is at least 50° C., at least 100° C., or at least 125° C. Generally the shape memory polymer will have an elastic modulus of at least 0.5 MPa at 80° C.

The SMP fasteners may be prepared from the shape memory polymer compositions by any suitable technique used for thermoplastic or thermoset polymers. The shaped articles may be cast into a suitable mold and cured, or injection molded, such as by reaction injection molding (RIM) whereby the polymer composition is injected into a mold and cured. Alternatively, in the case of thermoplastic polymers, the articles may be extruded.

The permanent and deformed shapes of the SMP fasteners are generally rod-like, having length and a width, and having no head, as in rivets. The preferably molded shape of the fastener is nominally cylindrical having a circular cross section and a preselected length. Other cross sections are also contemplated such as square, rectangular, higher polygons and ovoid. In some embodiments the SMP fastener may further include longitudinal grooves or ridges on the surface of the cylinder to accommodate insertion into the preformed openings of the cavities and subsequent expansion. The fastener is preferably rod shaped and solid, rather than hollow.

The original molded shape and size of the fastener are chosen such that the fastener (having preselected deformed shape) may be inserted into the cavities of the workpieces, heated to trigger the recovery of the shape memory polymer so that the workpieces are held securably affixed. Heating of the oriented fastener causes the fastener to expand laterally (in width) and shrink in length. By "securably affixed" it is meant that the two workpieces cannot be normally separated without damaging the workpieces or fasteners. However, the workpieces may be separated by heating the fastener above the transition temperature ($T_{trans}$) so the fastener becomes flexible.

In one embodiment the SMP is first formed into a nominal rod-like shape, then deformed to a temporary shape having a width and length suitable for insertion into the cavities of the workpieces. When heated, or otherwise triggered to recover the permanent shape, the SMP of the fastener expands to exert lateral pressure on the cavity surfaces and/or openings of the workpiece.

A suitable mold may be flexible or rigid. Useful materials for the mold include metal, steel, ceramic, polymeric materials (including thermoset and thermoplastic polymeric materials), or combinations thereof. The materials forming the mold should have sufficient integrity and durability to withstand the particular monomer compositions to be used as well as any heat that may be applied thereto or generated by the polymerization reaction. In some embodiments, the mold may comprise an injection mold. In this case, the mold may comprise two halves which mate together. For injection molding, a SMP monomer composition may be injected via an injection port into a cavity or cavities of the mold, and there is typically some output port for air, nitrogen, etc. to escape. Filling of the cavity may be facilitated by vacuum attached via the output port.

To prepare a fastener having shape memory, the fastener can be molded and optionally crosslinked (with the appropriate thermoset SMP) to form a permanent shape. As the fastener is subsequently deformed into a second shape, the fastener can be returned to its original permanent shape by heating the object above the $T_{trans}$. In other embodiments, a solvent such as alkyl alcohol, acetone, etc. can partially dissolve or plasticize the crystalline phase of thermoplastic SMPs and cause the same recovery.

The original formed article, having a first permanent shape, may be deformed into a fastener by either of two methods. In the first, the rod-like article, as molded, is heated above the $T_{trans}$, deformed to impart a temporary shape, then cooled below the $T_{trans}$ to lock in the temporary shape. In the second, the shaped rod-like article is deformed at a temperature below the $T_{trans}$ by the application of mechanical force, whereby the shaped article assumes a second temporary shape through forced deformation; i.e. cold drawing. When significant stress is applied, resulting in an enforced mechanical deformation at a temperature lower than the $T_{trans}$, strains are retained in the polymer, and the temporary shape change is maintained, even after the partial liberation of strain by the elasticity of the polymer.

The formed article may be subsequently deformed in one, two or three dimensions. All or a portion of the shaped article may be deformed by mechanical deformation. The shaped article may be deformed by any desired method including embossing, compression, twisting, shearing, bending, cold molding, stamping, stretching, uniformly or non-uniformly stretching, or combinations thereof. Generally the fastener is formed into a first substantially cylindrical shape and subsequently deformed by axial orientation (stretching). The axial orientation produces a longer and narrower cylinder than that first formed. This may be cut into preselected length suitable for forming a particular blind joint. The first rod-like shaped article may be deformed by axial orientation (stretching) at least 50%, preferably at least 100% and more preferably at least 200%. Such stretching will also result in narrowing from the original width.

The original or permanent shape is recovered by heating the fastener above the $T_{trans}$ whereby the stresses and strains are relieved and the material returns to its original shape. The original or permanent shape of the fastener can be recovered using a variety of energy sources. The fastener (and associated workpieces) can be immersed in a heated bath containing a suitable inert liquid (for example, water or a fluorochemical fluid) that will not dissolve or swell the fastener in either its cool or warm states. The fastener can also be softened using heat sources such as a hot air gun, hot plate, steam, conventional oven, infrared heater, radiofrequency ($R_f$) sources or microwave sources. The composition can be encased in a plastic pouch, syringe or other container which is in turn heated (e.g. electrically), or subjected to one or more of the above-mentioned heating methods.

In some embodiments, the fastener may include a conductive sleeve for facilitating heating and recovery to the permanent shape of the fastener. The sleeve may comprise a material that may be resistively heated or inductively heated. Preferably, the sleeve is in a form that will not retard recovery upon heating, such as a scrim that conforms to the recovered shape of the fastener.

In some embodiments, the fastener may include an elastomeric sleeve for facilitating the sealing of the assembly. After application of heat, and recovery of the fasteners, an elastomeric sleeve can form a seal at the interface of the assembled workpieces and cavities thereof.

Alternatively, the original shape of the fastener may be recovered by exposure to a low molecular weight organic compound, such as a solvent, which acts as a plasticizer. The low molecular weight organic compound diffuses into the polymer bulk, triggering the recovery by disrupting the crystallinity of the thermoplastic SMP.

In some embodiments, it may be desirable to recover only a portion of the fastener. For example, heat and/or solvent can be applied to only a portion of the deformed surface of the substrate to trigger the shape memory recovery in these portions only.

In one embodiment, the fastener may comprise a heating element, such as a resistive heating element encapsulated thereby. The resistive heating element may be in the form of a sleeve. After deformation, the resistive heating element may be connected to a source of electricity imparting heat to the bulk of the polymer, which raises the temperature above the $T_{Trans}$ so the deformed article assumes the original permanent shape. The workpieces may have apertures into the cavities to allow the connection of electrical leads. In another embodiment, a hot element, such as a hot needle may be inserted into the fastener by means of an aperture to effect recovery.

In another embodiment, the fastener may have materials for improving the mechanical properties of the fastener such as high tensile materials embedded therein. Such materials may be in the form of fibers or fine wires.

In other embodiments, the heating step may be an indirect heating step whereby the deformed polymer is warmed by irradiation, such as infrared radiation. As the responsiveness of the shape memory polymer is limited by the heat capacity and thermal conductivity, the heat transfer can be enhanced by the addition of conductive fillers such as conductive ceramics, carbon black and carbon nanotubes. Such conductive fillers may be thermally conductive and/or electrically conductive. With electrically conductive fillers, the polymer may be heated by passing a current therethough. In some embodiments, the shape memory polymer may be compounded with conductive fillers, and the polymer heated inductively by placing it in an alternating magnetic field to induce a current. In some embodiments, a conductive filler may be in the form of a core within the fastener.

The workpiece may comprise any material including glass, ceramic, masonry, concrete, natural stone, manmade stone, metals, wood, and plastics. The workpieces have at least one cavity therein, the cavity having an opening on a surface of the respective workpieces. The opening of the cavity may be of any cross-sectional shape such as circular, square, rectangular, higher polygons and ovoid, and preferably is chosen to be consistent with the cross-sectional shape of the fastener. Preferably the opening of the cavity is circular. The width of the cavity is chosen such that the fastener, when heated expands laterally to fill the void between the fastener and the opening and walls of the cavity.

Generally the width of the cavity is 100 to 200% of the width of the fastener—or conversely the width of the fastener is 50 to 100% that of the cavity. The width of the cavity may be constant through the depth, or may vary. In one embodiment the cavity has a first width at the opening of the cavity on a surface of the workpiece, and a second, wider width at a portion of the cavity adjacent the opening. Put another way, the cavity has a first width at the opening, and a second, wider width at a point distal of the opening, such as at a mid-point of the cavity depth or the bottom of the cavity. Advantageously, the fastener will expand laterally into the cavity to the first width at the opening, and expand further into the portion of the cavity at the second width, thereby forming a shoulder to resist pull out. At the same time the fastener with shrink axially engaging shoulders formed at the abutment at the first and second width thereby pulling the two workpieces together. In some embodiments, the cavity may have a first width at the opening, and taper to a wider second width at the distal end of the cavity.

The cavity may be of any suitable depth and each of the cavities has an open end at the opening on a surface of the workpiece and a blind end. The cavity is not a through-hole and may extend up to the thickness of the workpiece. The blind end of the cavity does not allow insertion of the fastener, but may allow insertion of a heating element. Generally the depth of the cavity is from 10 to 90% of the thickness of the workpiece, perpendicular to the plane of the opening.

The second workpiece may have a cavity of the same dimensions or different dimensions. Generally, the cross sectional shape and width are approximately the same, although the depth of each may vary. Generally each cavity has dimensions to securably affix the fastener. Generally the combined depths of the first and second cavities are greater than or equal to the length of the fastener to allow for insertion and longitudinal contraction. Preferably each cavity has a first width at the opening of the respective surfaces, and a second, wider width at that portion of the cavities adjacent the openings.

The first and/or second workpieces may have a small aperture into the cavity extending to a surface of the workpiece for insertion of a heating element. The size and shape of the aperture are such that a resistive heating element (or electrical leads therefore) may be inserted into the fastener, but the width thereof is narrower than that of the fastener. Generally the workpiece has only a single opening of suitable size for insertion of the fastener.

Additional workpieces may also be fastened by the method of this invention. In one embodiment, one or more additional workpieces may be inserted between the first and second workpieces, each having a through-hole therein which allows a fastener to be inserted into the cavity of the first workpieces, through the though-holes of one or more additional optional workpieces, and into the cavity of the second workpiece. The assembly comprising the first and second workpiece and fastener may further comprise one or more additional workpieces each having a through-hole instead of cavities, the through hole has a first opening on a first surface of the additional workpiece(s), a second opening on a second surface thereof, and a channel therebetween. The width thereof is generally the same as that of the cavity of the first workpiece. The fastener may be inserted into the cavity of the first workpiece and through the though-hole or the additional workpieces and into the cavity or the second workpiece.

Heating the fastener results in lateral expansion, and contraction along the longitudinal axis thus fastening the multiple workpieces together. When the fastening has recovered the original permanent shape, the openings and cavities that contain the fastener are no longer accessible. The fastener cannot be accessed without damaging the fastener, and/or the workpieces.

Embodiments of the invention are diagrammatically illustrated with reference to the Figures. In FIG. 1 two workpieces, 20 and 30, are illustrated in cross-section, each having a blind cavity 21 and 31 respectively. Blind cavity 31 has first width 32 at the opening on a surface of the workpiece and a larger second width 33 at a portion of the cavity adjacent the opening, distal from the opening. Workpiece 20 may have a first and second width as shown, or may have a constant width through the depth of the cavity. The cavity has a depth 34. Workpiece 20 is further shown with an optional aperture 22 to allow the insertion of a resistive heating element into fastener 10. Workpiece 30 may also be configured with an aperture. The width of the aperture 22 is less than the width of fastener 10.

The depth and width of cavity 21 of workpiece 20 may be the same or different from that of workpiece 30. Generally the cross-sectional shape of the cavities is the same. The fastener 10 is inserted into cavities 21 and 31 and workpieces 20 and 30 are brought together to form article 40. Fastener 10 has a width which is less than or equal to the width at the openings of cavities 21 and 31. Fastener 10 has a length no greater than the sum of the depths of the cavities and a length no less than 75% of the sum of the depths of the cavities 21 and 31.

FIG. 1 also illustrates optional adhesive layer 24, which may be used to adhesively secure workpieces 20 and 30 in a fixed position until secured by fastener 10.

Upon heating to a temperature above the transition temperature, fastener 10 expands laterally to the first width 32 and recovers, in part, the original shape, as constrained by the cavities as illustrated by fastener 50. Since the second width 33 is greater, the fastener 50 will expand further into that portion of the cavity adjacent the opening to form a shoulder 51 at the abutment of the first and second widths which can further retard separation of the workpieces. The fastener will further retract along the axial dimension further compressing the workpieces together.

FIG. 1 further illustrates an assembly 53 comprising a first and second workpiece, fastened in a blind joint by an inaccessible shape memory polymer fastener. The workpieces are securably fastened by means of the recovery of the shape memory polymer in response to heat, in which the fastener expands laterally to engage the surfaces of the cavities, and contracts or shrinks along the longitudinal axis so that the respective surfaces of the workpieces are drawn together in a blind joint. As illustrated, the fastener is inaccessible. Further, the fastener is not visible, except if the workpieces are transparent. Additional workpieces may also be inserted between the first and second workpieces, the additional workpieces having through-holes In FIG. 2, two workpieces, 61 and 71 are provided, each having a blind cavity 62 and 72 respectively. The cavities 62 and 72 may be representative of workpieces or applications having large cavities, such as when forming a joint with a hollow workpieces such as a rectangular tube, or in mounting a workpiece on a hollow wall. Workpiece 61 has an opening on a surface thereof having first width 63 and a second width 64 in a portion of the workpiece adjacent the opening. Cavity 62 has a depth 65. Workpiece 71 may have openings, widths and depths that are the same as workpiece 61 (as shown) or different. Fastener 80 is inserted into the openings of the cavities 62 and 72. Optional additional workpiece 75, having a though-hole, may be inserted between workpieces 61 and 71. One or more additional workpieces may be used, which may be any thickness, and any width and length.

Upon heating to a temperature above the transition temperature, fastener 80 expands laterally to the width of opening 63 and recovers, in part, the original shape, as constrained by the cavities and as illustrated by recovered fastener 90. Since the second width 64 is greater, the shape recovered fastener 90 will expand further that portion of the cavity adjacent the opening to form a shoulder 91 at the abutment of the first and second widths which can further retard separation of the workpieces. The fastener will further retract along the axial dimension further compressing the workpieces together.

Figure 2:
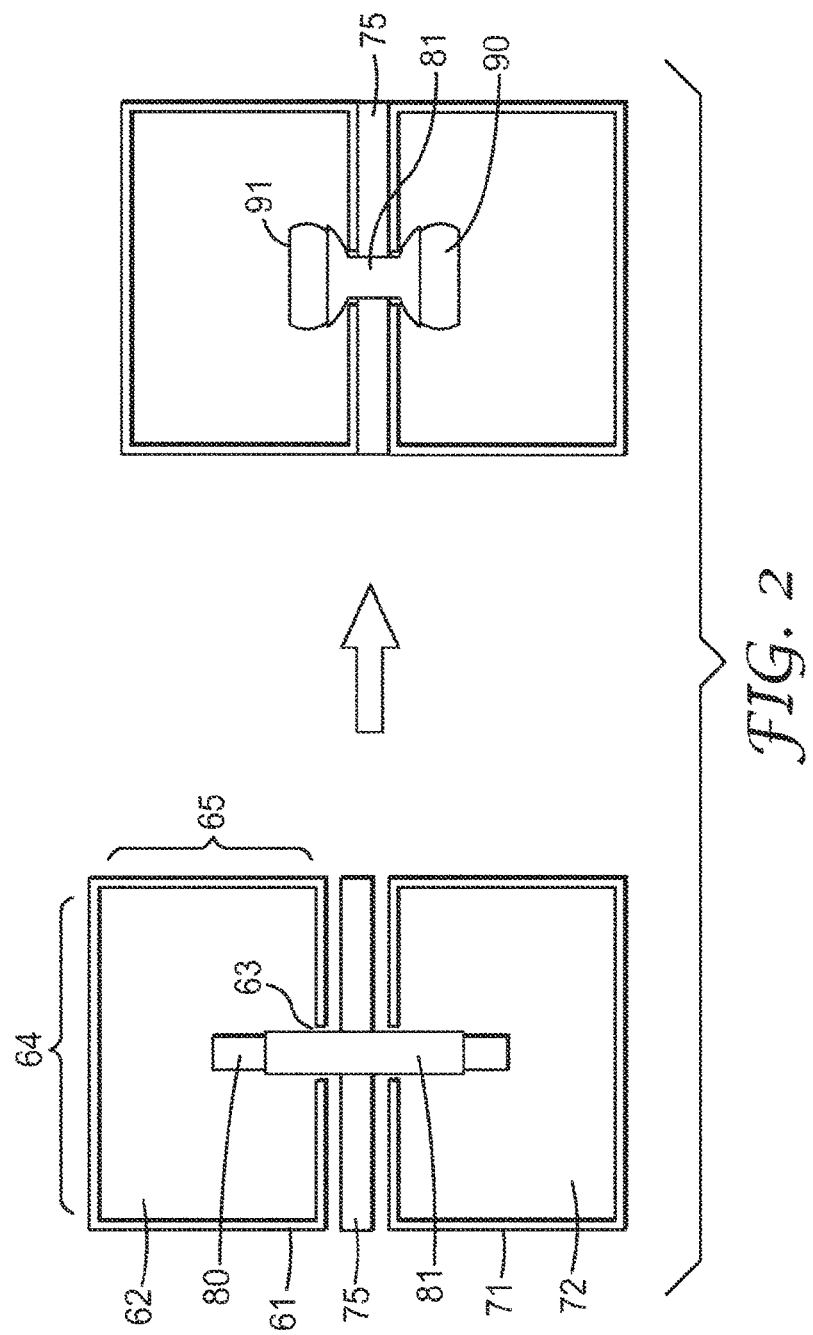

FIG. 2 also illustrates an optional sleeve 81, such as a resistive scrim. In the illustrated embodiment, the sleeve 81 conforms to the shape of the fastener 90, as shown. The sleeve may also comprise a non-conformable tube.

FIG. 2 further illustrates an assembly comprising a first and second workpiece, fastened in a blind joint by an inaccessible shape memory polymer fastener. As illustrated with rectangular tube workpieces, the fastener is not accessible, and is not visible when sighted along the axis of the fastener.

EXAMPLES

Example 1

Thermoplastic Polyurethane Fasteners

DiARY MM9020™ thermoplastic polyurethane shape memory polymer (DiAPLEX Co. Ltd, Tokyo, Japan) was injection molded into a 2.8 mm thick plaque. A portion of this plaque was cut into strips nominally 80 mm long with a rectangular cross-section 2.9 mm×2.8 mm. These strips were heated in a 100° C. oven and stretched by hand to an elongation of approximately 150%. The rectangular cross-section of the samples decreased to 1.8 mm×1.7 mm.

Tensile test specimens were prepared from polypropylene workpieces (88 mm×25 mm×0.6.2 mm) The center of one end of each workpiece (the 25 mm×6.2 mm face) was drilled normal to the surface with a cylindrical cavity (2.3 mm diameter, 13 mm deep). An additional hole (2.3 mm diameter, 7 mm deep) was then drilled in the same location on the sample's face, but at angle that was approximately 15° different from the bore of the original hole. A third hole (2.3 mm diameter, 7 mm deep) was then drilled in the same location, but that was also at an angle approximately 15° different from the bore of the original hole and oriented toward the opposite direction from the second hole. The result of the three drilling steps was a single cavity that was approximately 2.3 mm in diameter at the surface, and between 4 mm and 5 mm wide at a depth 7 mm from the surface.

The elongated polyurethane shape memory polymer samples were cut to a length of 25 mm and inserted into the cavities of two aligned polypropylene coupons. These assemblies were then placed in boiling water for 10 minutes, during which time the fasteners decreased in length and expanded laterally. After cooling to room temperature, the samples were tested under tension at 2"/min with a Sintech load frame equipped with a 1000 lbf maximum load cell and self-tightening grips. The average peak load for two samples was 22 lbf (97.9 N).

Example 2

DiARY MM9020 Polyurethane Rivets

Pellets of a thermoplastic polyurethane partly derived from methylene diphenyl diisocyanate, available under the trade designation DiARY MM9020 from SMP Technologies, Tokyo, Japan, were extruded through a single screw extruder to form a strand with a diameter of 0.20 inches (0.51 cm). A piece of this material was cut to 4 inches (10 cm) long, and a 1.5 inch (3.8 cm) gauge length in the center was marked with ink lines. The sample was loaded into the grips of a load frame equipped with an environmental chamber set at 90° C. The initial grip separation was 1.5 inches (3.8 cm) and the sample was equilibrated within the grips for three minutes prior to elongation. The sample was then elongated at a rate of 20 inches (51 cm) per minute to a displacement of 4.0 inches (10 cm). The sample was then wiped with a moistened paper towel to cool the material, and the sample was removed from the grips. The displacement of the marks indicated that the sample had been elongated by 250%. The diameter of the elongated strand had decreased to 0.10 inches (0.25 cm).

Example 3

Isoplast 301 Polyurethane Rivets

A 4 inch (10 cm) long strand of a thermoplastic polyurethane partly derived from methylene diphenyl diisocyanate, available under the trade designation Isoplast 301 from Lubrizol, Wickliffe, Ohio, with a rectangular cross-section of 0.14 inches×0.15 inches (0.36 cm×0.38 cm) was cut from a molded sheet supplied by Lubrizol. A 1.25 inch (3.2 cm) gauge length in the center was marked with ink lines. The sample was loaded into the grips of a load frame equipped with an environmental chamber set at 100° C. The initial grip separation was 1.25 inches (3.2 cm), and the sample was equilibrated within the grips for three minutes prior to elongation. The sample was then elongated at a rate of 20 inches (51 cm) per minute to a displacement of 6.0 inches (15 cm). The sample was then wiped with a moistened paper towel to cool the material, and the sample was removed from the grips. The displacement of the marks indicated that the sample had been elongated by 170%. The cross-section of the elongated strand had decreased to 0.08 inches×0.08 inches (0.2 cm×0.2 cm).

Example 4

Isoplast 202EZ Polyurethane Rivets

A 4 inch (10 cm) long strand of a thermoplastic polyurethane partly derived from methylene diphenyl diisocyanate, available under the trade designation Isoplast 202EZ from Lubrizol, Wickliffe, Ohio, with a rectangular cross-section 0.055 inches×0.039 inches (0.14 cm×0.10 cm) was cut from a sheet of material prepared in a hydraulic press at 150° C. A 1.25 inch (3.2 cm) gauge length in the center was marked with ink lines. The sample was loaded into the grips of a load frame equipped with an environmental chamber set at 130° C. The initial grip separation was 1.25 inches (3.2 cm), and the sample was equilibrated within the grips for three minutes prior to elongation. The sample was then elongated at a rate of 20 inches (51 cm) per minute to a displacement of 1.78 inches (4.5 cm). The sample was then wiped with a moistened paper towel to cool the material, and the sample was removed from the grips. The displacement of the marks indicated that the sample had been elongated by 134%. The cross-section of the elongated strand had decreased to 0.039 inches×0.024 inches (0.10 cm×0.06 cm).

Comparative Example 1

Styrene-Based Rivets

A two-part styrene-based shape memory polymer resin with the tradename Veriflex was purchased from Cornerstone Research Group, Inc., Dayton, Ohio. The resin (28.8 grams) was mixed with the hardener (1.2 grams) for 15 seconds with a SpeedMixer (Flacktek, Inc. Landrum, S.C.). The mixed resin was transferred with a pipette to a 24 inch (61 cm) length of Tygon tubing (F4040A) with an inside diameter of 0.18 inches (0.46 cm) and an outside diameter of 0.31 inches (0.79 cm). Both ends of the tubing were clamped shut with C-clamps. The filled tube was placed in an oven that was set to 40° C. for 25 minutes, then to 65° C. for 25 minutes, then to 75° C. for 16 hours. The tubing was then cut away from the partially cured resin, and the cylindrical strand of resin was postcured for 2 hours in a 90° C. oven and 1 hour in a 120° C. oven. The resulting strand was cut into a 4 inch (10 cm) length and had an elliptical or oval cross-section with a major diameter of 0.17 inches (0.43 cm) and a minor diameter of 0.12 inches (0.30 cm). A gauge length in the center was marked with ink lines. The sample was loaded into the grips of a load frame equipped with an environmental chamber set at 100° C. The initial grip separation was 1.75 (4.4 cm) and the sample was equilibrated within the grips for three minutes prior to elongation. The sample was then elongated at a rate of 20 inches (51 cm) per minute to a displacement of 2.0 inches (5.1 cm). The sample was then wiped with a moistened paper towel to cool the material, and the sample was removed from the grips. The displacement of the marks indicated that the sample had been elongated by 110%. The diameters of the elongated strand had decreased to 0.12 inches (0.30 cm) and 0.09 inches (0.23 cm).

Comparative Example 2

Epoxy Rivets

A two-part epoxy-based shape memory polymer resin with the tradename Veriflex E was purchased from Cornerstone Research Group, Inc. Part A of the resin (25.0 grams) was mixed with Part B of the Resin (6.77 grams) for 2 minutes with a SpeedMixer. The mixed resin was degassed under vacuum and then was transferred with a pipette to a 24 inch (61 cm) length of Tygon tubing with an inside diameter of 0.18 inches (0.46 cm) and an outside diameter of 0.31 inches (0.79 cm). Both ends of the tubing were clamped shut with C-clamps. The filled tube was placed in an oven that was set to 120° C. for 4 hours and then to 130° C. for 14 hours. The tubing was then cut away from the partially cured resin, and the cylindrical strand of resin was postcured for 4 hours in a 150° C. oven. During the postcure, the cylindrical strand partially flattened to form a strand with a major diameter of 0.21 inches (0.513 cm) and a minor diameter of 0.14 inches to 0.16 inches (0.36 cm to 0.41 cm). The resulting strip and was cut into a 4 inch (10 cm) length. A gauge length in the center was marked with ink lines separated by 1.75 inches (4.4 cm). The sample was loaded into the grips of a load frame equipped with an environmental chamber set at 120° C. The initial grip separation was 1.75 inches (4.4 cm) and the sample was equilibrated within the grips for three minutes prior to elongation. The sample was then elongated at a rate of 20 inches (51 cm) per minute to a displacement of 2.75 inches (7.0 cm). The sample was then wiped with a moistened paper towel to cool the material, and the sample was removed from the grips. The displacement of the marks indicated that the sample had been elongated by 157%. The strip had decreased to diameters of 0.13 inches (0.33 cm) and between 0.10 to 0.09 inches (0.25 cm×0.23 cm).

Comparative Example 3

Acrylic Rivets

Isobornyl acrylate (65 g), tetrahydrofurfuryl acrylate (25 g), difunctional aliphatic urethane oligomer CN9009 (10 g, from Sartomer, Exton, Pa.) and Lucirin TPO-L photoinitiator (0.35 g, from BASF, Florham Park, N.J.) were mixed in an amber jar thoroughly with a magnetic stir bar for 1 hour. A portion of the mixture was then transferred with a pipette to a 24 inch (61 cm) length of clear plastic tubing. Both ends of the tubing were clamped shut with C-clamps. The tubing was placed under a bank of black lights for 30 minutes to cure the acrylic polymer. Following polymerization, the plastic tubing was cut away from the resulting polymer rod with a diameter of 0.17 inches (0.43 cm). The polymer was cut into a 4 inch (10 cm) length. A gauge length in the center was marked with ink lines separated by 1.75 inches (4.4 cm). The sample was loaded into the grips of a load frame equipped with an environmental chamber set at 55° C. The initial grip separation was 1.75 inches (4.4 cm) and the sample was equilibrated within the grips for three minutes prior to elongation. The sample was then elongated at a rate of 2.0 inches (5.1 cm) per minute to a displacement of 2.0" inches (5.1 cm). The sample was then wiped with a moistened paper towel to cool the material, and the sample was removed from the grips. The displacement of the marks indicated that the sample had been elongated by 100%. The strand had decreased to diameter to 0.12 inches (0.30 cm).

Comparative Example 4

Mixture of Vulcanized Rubber and Thermoplastic Resin

Acrylonitrile/Butadiene/Styrene resin powder with high butadiene content (33.3 g, from Scientific Polymer Products, Inc., Ontario, N.Y., product number 051) and Polyisoprene (13.3 g, from Sigma Aldrich, St. Louis, Mo., product number 431265) were mixed in a Brabender mixer (ATR Plasticorder with a Three Piece Mixer/Measuring Head, from C.W. Brabender, So. Hackensack, N.J.), at 60° C. for three minutes at 100 revolutions per minute. Steric acid (0.42 g, EMD chemicals, Gibbstown, N.J., product number SX0947) and zinc oxide (1.3 g, Alfa Aesar, Ward Hill, Mass., product number 44263) were then added and mixed for an additional three minutes. Benzothiazyl disulfide (0.28 g, R.T. Vanderbilt Company, Inc., Norwalk, Conn., trade name "Altax") and sulfur powder (1.1 g, Alfa Aesar, product number 33394) were then added, and the mixing was continued for an additional five minutes. A 5.4 g portion of the resulting mixture was placed in the opening (1.4 cm×10 cm) within a sheet of aluminum (15 cm×4 cm×0.16 cm), and was then pressed at with 25,000 pounds at 320° F. for 20 minutes in a hydraulic press. A piece of the resulting sheet was cut into a strip 0.15 cm×0.41 cm×5 cm. Ink marks were placed at 1 cm intervals on the strip. The strip was heated with a hot air gun (from Master Appliance Corporation, Racine, Wis.) set at 500° F. for 10 seconds, and the strip was then elongated by hand while hot. Upon cooling, the ink marks were separated by 2 cm, indicating an elongation of 100%. The resulting elongated strand was tested within 24 hours with thermal ramp recovery tests.

Thermal Ramp Recovery Profiles

A piece of rivet strand was cut to 40 mm and loaded into the tensile grips of an RSA-G2 DMA (TA Instruments, New Castle, Del.) with an initial separation of 25 mm. In one test series, the temperature was ramped at a rate of 3° C. per minute while a nominal tensile force of 0.005 N was maintained on the rivet strand to allow the grips to track the length of the rivet. In an additional test series, the conditions were equivalent except the temperature was ramped at 0.1° C. per minute. The resulting change in rivet length as a function of temperature was measured at each ramp rate. The length change when the rivet was fully contracted in the 3° C. per minute testing is shown in Table 1. In the testing at 0.1° C. per minute, the temperature at which the observed length change was 5% of the final length change was used to indicate the end of the rigid state, since that is the temperature at which long-term shape stability is no longer observed. Similarly, in the testing at 3° C. per minute, the temperature at which the observed length change was 95% of the final length change was used to indicate the beginning of the rubber state, since that is the temperature at which rapid elastic recovery is observed. The difference in temperature between the end of the rigid state and the beginning of the rubber state is an indication of the sharpness of the transition.

| Example | Final Length Change | End of Rigid State[a] | Beginning of Rubber State[b] | Transition Sharpness | Glass Transition Temperature |
|---|---|---|---|---|---|
| Example 2 | 16.96 mm | 75.8° C. | 95.2° C. | 19.4° C. | 94° C. |
| Example 3 | 16.48 mm | 95.5° C. | 113.4° C. | 17.9° C. | 118° C. |
| Example 4 | 15.05 mm | 126.5° C. | 147.3° C. | 20.8° C. | 153° C. |
| Comp. Ex. 1 | 14.16 mm | 52.7° C. | 95.6° C. | 42.9° C. | — |
| Comp. Ex. 2 | 17.02 mm | 76.7° C. | 108.9° C. | 32.2° C. | — |
| Comp. Ex. 3 | 14.35 mm | 42.4° C. | 63.5° C. | 21.1° C. | — |
| Comp. Ex. 4 | 13.11 mm | 82.3° C. | 128.6° C. | 46.3° C. | — |

[a]Temperature for 5% of final length change in testing at 0.1° C. per minute
[b]Temperature for 95% of final length change in testing at 3° C. per minute Dynamic Mechanical Analysis (DMA) Testing DMA experiments were performed in tensile mode on a Q800 Dynamic Mechanical Analyzer (TA Instruments, New Castle, Del.). Test samples were strips of material nominally 1 mm thick and 6 mm wide with a test length of 16 mm to 19 mm. The amplitude was set at 40 microns, the frequency was 1 Hz, and the temperature ramp rate was 3° C./min. The glass transition temperature of the material was defined as the temperature corresponding to the peak of the tan delta signal.

What is claimed is:

1. A fastener comprising a thermoplastic polyurethane shape memory polymer having a transition temperature ($T_{trans}$) of at least 50° C.; the fastener comprising a length, a width, and no head; wherein the fastener is axially oriented at least 50% in the longitudinal direction.

2. The fastener of claim 1, wherein the thermoplastic polyurethane shape memory polymer comprises a thermoplastic polyurethane with a hard segment as a permanent shape and a soft segment as a switching temporary shape.

3. The fastener of claim 1, wherein the thermoplastic polyurethane shape memory polymer is partly derived from methylene diphenyl diisocyanate.

4. The fastener of claim 1, wherein the fastener is axially oriented at least 100% in the longitudinal direction.

5. The fastener of claim 4, wherein the fastener is axially oriented 150% in the longitudinal direction.

6. The fastener of claim 4, wherein the fastener is axially oriented at least 200% in the longitudinal direction.

7. The fastener of claim 1, wherein the thermoplastic polyurethane shape memory polymer has a transition temperature ($T_{trans}$) of at least 100° C.

8. The fastener of claim 7, wherein the thermoplastic polyurethane shape memory polymer has a transition temperature ($T_{trans}$) of at least 125° C.

9. The fastener of claim 1, wherein the fastener has a rod shape.

10. The fastener of claim 9, wherein the fastener is a rivet.

11. The fastener of claim 1, wherein the fastener has a solid cross-section.

12. The fastener of claim 11, wherein the fastener has a cross-section selected from the group consisting of cylindrical, ovoid, square, rectangular, and higher polygonal.

13. The fastener of claim 12, wherein the fastener has a cylindrical cross-section.

14. The fastener of claim 13, wherein an outer surface of the fastener comprises grooves or ridges.

15. The fastener of claim 1, wherein the transition temperature ($T_{trans}$) is a glass transition temperature ($T_g$).

16. The fastener of claim 15, wherein the thermoplastic polyurethane shape memory polymer has a glass transition temperature ($T_g$) of at least 100° C.

17. The fastener of claim 16, wherein the thermoplastic polyurethane shape memory polymer has a glass transition temperature ($T_g$) of at least 125° C.

* * * * *